(12) United States Patent
Whipple et al.

(10) Patent No.: US 6,369,182 B1
(45) Date of Patent: Apr. 9, 2002

(54) CATIONIC LATEX TERPOLYMERS FOR WASTERWATER TREATMENT

(75) Inventors: Wesley L. Whipple, Naperville; Ananthasubramanian Sivakumar, Aurora, both of IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/416,162

(22) Filed: Oct. 11, 1999

(51) Int. Cl.$^7$ ............... C08F 200/56; C08F 200/58; C08F 200/60

(52) U.S. Cl. ............ 526/307; 210/705; 210/723; 210/734; 526/307.1; 526/307.3; 526/307.7; 526/310; 526/312; 526/326

(58) Field of Search .............. 526/307, 307.3, 526/307.1, 307.7, 310; 210/705, 723, 734

(56) References Cited

U.S. PATENT DOCUMENTS

| | | | |
|---|---|---|---|
| 4,524,175 A | | 6/1985 | Stanley |
| 4,918,123 A | | 4/1990 | Yang et al. |
| 5,051,487 A | | 9/1991 | Bhattacharyya et al. |
| 5,368,774 A | | 11/1994 | Borgard et al. |
| 5,804,214 A | * | 9/1998 | Wong ............ 424/448 |
| 6,018,033 A | * | 1/2000 | Chen ............ 536/4.1 |
| 6,057,409 A | * | 5/2000 | Cunningham ........ 526/201 |
| 6,117,921 A | * | 9/2000 | Ma ............ 523/161 |

FOREIGN PATENT DOCUMENTS

| | | |
|---|---|---|
| CA | 2060042 | 1/1992 |
| JP | 06157668 | 6/1994 |

* cited by examiner

Primary Examiner—Fred Zitomer
(74) Attorney, Agent, or Firm—Michael B. Martin; Thomas M. Breininger

(57) ABSTRACT

This invention is directed to a cationic terpolymer comprising (a) a first monomer unit selected from acrylamide and methacrylamide;

(b) a second monomer unit selected from dimethylaminoethyl acrylate methyl chloride quaternary salt, 3-(acrylamido)propyltrimethylammonium chloride, 3-(methacrylamido)propyltrimethylammonium chloride, dimethylaminoethyl methacrylate methyl chloride quaternary salt, dimethylaminoethyl acrylate dimethylsulfate quaternary salt, dimethylaminoethyl methacrylate dimethylsulfate quaternary salt, diethylaminoethyl acrylate methyl chloride quaternary salt and diethylaminoethyl acrylate dimethylsulfate quaternary salt; and (c) a third monomer unit selected from benzyl methacrylate, 2,2,2-trifluoroethyl acrylate, acrylamide diacetone, N-phenylacrylamide, 2,2,3,3-tetrafluoropropyl acrylate and poly(propylene glycol) methacrylate. The terpolymer is useful for dewatering a variety of sludges.

23 Claims, No Drawings

CATIONIC LATEX TERPOLYMERS FOR WASTEWATER TREATMENT

TECHNICAL FIELD

This invention concerns cationic latex terpolymer flocculants and their use for waste water treatment.

BACKGROUND OF THE INVENTION

It is well known that the clarification or dewatering of sewage and industrial sludges and similar organic suspensions may be aided by chemical reagents, added in order to induce a state of coagulation or flocculation which facilitates the process of solid/liquid or liquid/liquid separation from water. For this purpose, lime or salts of iron or aluminum have been utilized. More recently synthetic polyelectrolytes, particularly certain cationic latex flocculants such as copolymers of acrylamide and dimethylaminoethylacrylate, have been found to be of interest.

These types of polymers are broadly termed coagulants and flocculants. These polymers can be utilized in such diverse processes as emulsion breaking, sludge dewatering, raw water clarification, drainage and retention aids in the manufacture of pulp and paper, flotation aids in mining processing and color removal.

In the water treatment field of solids/liquid separation, suspended solids are removed from water by a variety of processes, including sedimentation, straining, flotation, filtration, coagulation, flocculation, and emulsion breaking among others. Additionally, after suspended solids are removed from the water they must often be dewatered so that they may be further treated or properly disposed of Liquids treated for solids removal often have as little as several parts per billion of suspended solids or dispersed oils, or may contain large amounts of suspended solids or oils. Solids being dewatered may contain anywhere from 0.25 weight percent solids, to 40 or 50 weight percent solids material. Solids/liquid or liquid/liquid separation processes are designed to remove solids from liquids, or liquids from liquids.

While strictly mechanical means have been used to effect solids/liquid separation, modern methods often rely on mechanical separation techniques that are augmented by synthetic and natural polymeric materials to accelerate the rate at which solids can be removed from water. These processes include the treatment of raw water with cationic coagulant polymers that settle suspended inorganic particulates and make the water usable for industrial or municipal purposes. Other examples of these processes include the removal of colored soluble species from paper mill effluent wastes, the use of organic flocculant polymers to flocculate industrial and municipal waste materials, sludge recovery and emulsion breaking.

A benchmark test for evaluating the effectiveness of a flocculant is the so-called drainage test in which the polymer is added to sludge and mixed so that the polymer flocculates the sludge. The mixture is then poured through a belt filter press cloth and the rate at which water drains is taken as a measure of polymer performance.

Regarding the mechanism of separation processes, particles in nature have either a cationic or anionic charge. Accordingly, these particles often are removed by a water-soluble coagulant or flocculent polymer having a charge opposite to that of the particles. This is referred to as a polyelectrolyte enhanced solids/liquid separation process, wherein a water-soluble or dispersible ionically charged polymer is added to neutralize the charged particles or emulsion droplets to be separated. The dosage of these polymers is critical to the performance of the process. Too little ionically charged polymer, and the suspended particles will not be charge neutralized and will thus still repel each other. Too much polymer, and the polymer will be wasted, or worse, present a problem in and of itself.

Notwithstanding the variety of commercially available polymers that have been found to be capable of flocculating or coagulating solids sludges, there are various circumstances which tend to limit the usefulness of these reagents. While for certain sludges economical treatments with these known reagents are feasible, more often sludges require very high and cost-ineffective dosages of reagents for successful treatment. Moreover, variations often occur in sludge from any one source. For example, variations in the supply of material to the waste water/sludge/paper furnish process water and/or in the oxidizing conditions that may be involved in the production of these waters lead to a variety of particle types which must be removed. Furthermore, it is not uncommon to encounter sludges that are, for some reason, not amenable to flocculation by any of the known polymeric flocculating agents.

Therefore, there is a need for an improved family of polymers that provide better drainage at lower doses than the currently-available acrylamide/dimethylaminoethylacrylate copolymers.

SUMMARY OF THE INVENTION

We have discovered new cationic terpolymers which are 15 to 20 percent more efficient than currently-available acrylamide/dimethylaminoethylacrylate copolymers.

Accordingly, in its principle aspect, this invention is directed to a cationic terpolymer comprising
(a) a first monomer unit selected from acrylamide and methacrylamide;
(b) a second monomer unit selected from dimethylaminoethyl acrylate methyl chloride quaternary salt, 3-(acrylamido)propyltrimethylammonium chloride, 3-(methacrylamido)propyltrimethylammonium chloride, dimethylaminoethyl methacrylate methyl chloride quaternary salt, dimethylaminoethyl acrylate dimethylsulfate quaternary salt, dimethylaminoethyl methacrylate dimethylsulfate quaternary salt, diethylaminoethyl acrylate methyl chloride quaternary salt and diethylaminoethyl acrylate dimethylsulfate quaternary salt; and
(c) a third monomer unit selected from benzyl methacrylate, 2,2,2-trifluoroethyl acrylate, acrylamide diacetone, N-phenylacrylamide, 2,2,3,3-tetrafluoropropyl acrylate and poly(propylene glycol) methacrylate.

DETAILED DESCRIPTION OF THE INVENTION

Definitions of Terms

As used herein, the following abbreviations and terms shall have the following meanings:

"ADA" means diacetone acrylamide, available from Chemie Linz U.S. Inc., Fort Lee, N.J.

"Alfonic®1412-60" is a ethoxylated linear alcohol (60% ethylene oxide), available from Vista Chemical Co., Houston, Tex.

"AM" for acrylamide.

"AIBN" for 2,2'-azobis(isobutyronitrile), available from E.I. duPont Nemours & Co. Inc.; Wilmington, Del.

"AIVN" for 2,2'-azobis(2,4-dimethylvaleronitrile), available from E.I. duPont Nemours & Co. Inc.; Wilmington, Del.

"DMAEA" for dimethylaminoethyl acrylate.

"DMAEM" for dimethylaminoethyl methacrylate.

"DMAEA.MCQ" for dimethylaminoethyl acrylate, methyl chloride quaternary salt.

"EDTA.4Na+" for ethylenediaminetetraacetic acid, tetrasodium salt.

"NaCl" for sodium chloride.

"NaNO$_3$" for sodium nitrate.

"POE" for polyoxyethylene.

"PPG" for poly(propylene glycol).

"Span 80" for sorbitan monooleate from ICI Specialty Chemicals, Wilmington, Del.

"Triton®N-101" for Nonylphenoxy polyethoxy ethanol, available from Rohm and Haas Co., Philadelphia, Pa.

"Tween 61" for POE (4) sorbitan monostearate, available from ICI Specialty Chemicals, Wilmington, Del.

"$^1$H-NMR" for Proton Nuclear Magnetic Resonance Spectroscopy.

"rpm" for revolutions-per-minute.

"Chain Transfer Agent' means any molecule, used in free-radical polymerization, which will react with a polymer radical forming a dead polymer and a new radical. Representative Chain Transfer Agents are listed by K. C. Berger and G. Brandrup, *"Transfer Constants to Monomer, Polymer, Catalyst, Solvent, and Additive in Free Radical Polymerization,"* Section II, pp. 81–151, in *"Polymer Handbook,"* edited by J. Brandrup and E. H. Immergut, 3d edition, 1989, John Wiley & Sons, New York.

"Inverse emulsion polymer" and "inverse latex polymer" mean a water-in-oil polymer emulsion comprising a cationic terpolymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference.

Inverse emulsion polymers are prepared by dissolving the required monomers in the water phase, dissolving the emulsifying agent in the oil phase, emulsifying the water phase in the oil phase to prepare a water-in-oil emulsion, homogenizing the water-in-oil emulsion and polymerizing the monomers to obtain the polymer. A self-inverting surfactant may be added to the water-soluble polymer dispersed within the hydrocarbon matrix to obtain a self-inverting water-in-oil emulsion. Alternatively, a polymer solution can be made-up by inverting the polymer dispersed in oil in to water containing the surfactant.

"RSV" stands for Reduced Specific Viscosity. Within a series of polymer homologs which are substantially linear and well solvated, "reduced specific viscosity (RSV)" measurements for dilute polymer solutions are an indication of polymer chain length and average molecular weight according to Paul J. Flory, in *"Principles of Polymer Chemistry"*, Cornell University Press, Ithaca, N.Y.,© 1953, Chapter VII, *"Determination of Molecular Weights"*, pp.266–316. The RSV is measured at a given polymer concentration and temperature and calculated as follows:

$$RSV = \frac{[(\eta/\eta_o) - 1]}{c}$$

$\eta$ = viscosity of polymer solution $\eta_o$ = viscosity of solvent at the same temperature $c$ = concentration of polymer in solution.

The units of concentration "c" are (grams/100 ml or g/deciliter). Therefore, the units of RSV are dl/g. In this patent application, for measuring RSV, the solvent used is 1.0 molar sodium nitrate solution. The polymer concentration in this solvent is 0.045 g/dl. The RSV is measured at 30° C. The viscosities $\eta$ and $\eta_0$ are measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/grams. When two polymer homologs within a series have similar RSV's that is an indication that they have similar molecular weights.

"Based on polymer active" and "based on monomer" mean the amount of a reagent added based on the level of vinylic monomer in the formula, or the level of polymer formed after polymerization, assuming 100% conversion.

"Based on formula" means the amount of reagent added based on the total formula weight.

PREFERRED EMBODIMENTS

In a preferred aspect of this invention, the cationic latex terpolymer has a cationic charge of from about 20% to about 80%.

In another preferred aspect of this invention, the cationic latex terpolymer has a cationic charge of from about 30% to about 70%.

In another preferred aspect of this invention, the third monomer is benzyl methacrylate in an amount of from about 0.01 to about 2 mole percent.

In another preferred aspect of this invention, the third monomer is benzyl methacrylate in an amount of from about 0.2 to about 0.7 mole percent.

In another preferred aspect of this invention, the third monomer is benzyl methacrylate in an amount of about 0.45 mole percent.

In another preferred aspect of this invention, the cationic latex terpolymer further comprises a chain transfer agent.

In another preferred aspect of this invention, the chain transfer agent is sodium formate in an amount of from about 0.0025 to about 0.08 weight percent based on formula.

In another preferred aspect of this invention, the third monomer is benzyl methacrylate that is present in a amount ranging from about 0.2 to about 0.7 mole percent and the polymer further comprises sodium formate in an amount of from about 0.0025 to about 0.08 weight percent based on formula.

In another preferred aspect of this invention, the third monomer is N-phenylacrylamide in an amount of from about 0.2 to about 1.2 mole percent.

In another preferred aspect of this invention, the third monomer is 2,2,2-trifluoroethyl acrylate in an amount of from about 0.2 to about 0.7 mole percent.

In another preferred aspect of this invention, the third monomer is 2,2,3,3-tetrafluoropropyl acrylate in an amount of from about 0.1 to about 0.5 mole percent.

In another preferred aspect of this invention, the third monomer is poly(propylene glycol)methacrylate in an amount of about 0.45 mole percent, wherein the poly(propylene glycol)methacrylate monomer has a molecular weight of from about 350 to about 389.

In another preferred aspect of this invention, the first monomer is acrylamide and the second monomer is dimethylaminoethyl acrylate methyl chloride quaternary salt.

In another preferred aspect of this invention, the mole ratio of acrylamide monomer units to dimethylaminoethyl acrylate methyl chloride quaternary salt monomer units is from about 8:2 to about 2:8.

In another preferred aspect of this invention, the mole ratio of acrylamide monomer units to dimethylaminoethyl acrylate methyl chloride quaternary salt monomer units is from about 7:3 to about 3:7.

In another preferred aspect of this invention, the first monomer unit is acrylamide, the second monomer unit is dimethylaminoethylacrylate methyl chloride quaternary salt and the third monomer unit is benzyl methacrylate, wherein the terpolymer has a cationic charge of from about 30 mole percent to about 70 mole percent and the benzyl methacrylate present in a amount of from about 0.2 mole percent to about 0.7 mole percent.

In another preferred aspect of this invention, the cationic latex terpolymer further comprises from about 0.0025 to about 0.08 weight percent based on formula of sodium formate.

In another aspect, this invention is directed to a method for flocculating sludge comprising adding to the sludge an effective amount of the cationic latex terpolymer comprising
(a) a first monomer unit selected from acrylamide and methacrylamide;
(b) a second monomer unit selected from dimethylaminoethyl acrylate methyl chloride quaternary salt, 3-(acrylamido)propyltrimethylammonium chloride, 3-(methacrylamido)propyltrimethylammonium chloride, dimethylaminoethyl methacrylate methyl chloride quaternary salt, dimethylaminoethyl acrylate dimethylsulfate quaternary salt, dimethylaminoethyl methacrylate dimethylsulfate quaternary salt, diethylaminoethyl acrylate methyl chloride quaternary salt and diethylaminoethyl acrylate dimethylsulfate quaternary salt; and
(c) a third monomer unit selected from benzyl methacrylate, 2,2,2-trifluoroethyl acrylate, acrylamide diacetone, N-phenylacrylamide, 2,2,3,3-tetrafluoropropyl acrylate and poly(propylene glycol) methacrylate.

In a preferred aspect of this invention, the cationic latex terpolymer is added in an amount of from about 10 ppm to about 600 ppm, more preferably from about 15 ppm to about 400 ppm and still more preferably from about 20 ppm to about 200 ppm based on polymer actives.

In another aspect, this invention is directed to a method of separating solids from waste water comprising:
(a) adding an effective amount of a cationic latex terpolymer comprising
(i) a first monomer unit selected from acrylamide and methacrylamide;
(ii) a second monomer unit selected from dimnethylaminoethyl acrylate methyl chloride quaternary salt, 3-(acrylamido)propyltrimethylammonium chloride, 3-(methacrylamido)propyltrimethylammonium chloride, dimethylaminoethyl methacrylate methyl chloride quaternary salt, dimethylaminoethyl acrylate dimethylsulfate quaternary salt, dimethylaminoethyl methacrylate dimethylsulfate quaternary salt, diethylaminoethyl acrylate methyl chloride quaternary salt and diethylaminoethyl acrylate dimethylsulfate quaternary salt; and
(iii) a third monomer unit selected from benzyl methacrylate, 2,2,2-trifluoroethyl acrylate, acrylamide diacetone, N-phenylacrylamide, 2,2,3,3-tetrafluoropropyl acrylate and poly(propylene glycol)methacrylate to the waste water;
(b) mixing the waste water and cationic latex terpolymer to form a mixture of water and flocculated solids and
(c) separating the flocculated solids from the water.

In a preferred aspect, the the cationic latex terpolymer is added in an amount of from about 10 ppm to about 600 ppm, more preferably from about 15 ppm to about 400 ppm and still more preferably from about 20 ppm to about 200 ppm based on polymer actives.

In another preferred aspect, the flocculated solids are separated from the water by filtration.

Preparation of the Polymers

Emulsion polymerizations are carried out at either a 45 gram, 900 gram, 1 kilogram or 2.4 kilogram scale using an appropriate vessel with standard equipment and procedures known to those skilled in the art. All reactions are carried out under a nitrogen atmosphere. The reaction temperature was controlled using an Athena temperature controller.

For terpolymers which contain water soluble monomers such as acrylamide diacetone (ADA) or N-phenylacrylamide, the monomer phase included these monomers prior to the formation of the emulsion. Oil soluble monomers such as fluorinated acrylates, benzyl methacrylate and poly(propylene glycol)methacrylate (PPG methacrylate) are added to the emulsion in the vessel 15 minutes prior to the addition of initiators.

The properties of representative cationic latex terpolymers of this invention are summarized in Table 1. In Table 1, copolymers 1, 2, 12 and 14 are prepared for comparative purposes. Polymers 1, 2, 3, 5 and 6 are prepared using the procedure of Polymer 4. Polymers 11 and 12 are prepared using the procedure of Polymer 13. Polymers 15, 17 and 18 are prepared using the method of Polymer 16.

TABLE 1

Properties of Cationic Latex Terpolymers

| Polymer | Mole % DMAEA.MCQ | TERMONOMER Hydrophobic Monomer | Mole % | Percent Sodium formate[1] | RSV @ 450 ppm |
|---|---|---|---|---|---|
| 1 | 30 | | | 0.00 | 23.4 |
| 2 | 30 | | | 0.02 | 17.5–18.3 |
| 3 | 30 | A | 0.20 | 0.00 | 23.3 |
| 4 | 30 | A | 0.45 | 0.00 | 24.8–28.4 |
| 5 | 30 | A | 0.70 | 0.00 | 28.4 |
| 6 | 30 | A | 0.45 | 0.01 | 29.7 |
| 7 | 30 | B | 1.00 | 0.00 | 23.7 |
| 8 | 30 | C | 0.49 | 0.00 | 23.2 |
| 9 | 30 | D | 0.48 | 0.00 | 23.7 |
| 10 | 30 | E | 0.46 | 0.00 | 22.9 |
| 11[F] | 40 | | | 0.00 | 20.3 |
| 12[F] | 40 | A | 0.45 | 0.00 | 21.4 |
| 13 | 40 | A | 0.45 | 0.01 | 21.9 |
| 14 | 50 | | | 0.00 | 16–24 |
| 15 | 50 | A | 0.20 | 0.00 | 20.9 |
| 16 | 50 | A | 0.45 | 0.00 | 21.6 |

TABLE 1-continued

Properties of Cationic Latex Terpolymers

| Polymer | Mole % DMAEA.MCQ | TERMONOMER Hydrophobic Monomer | Mole % | Percent Sodium formate[1] | RSV @ 450 ppm |
|---|---|---|---|---|---|
| 17 | 50 | A | 0.70 | 0.00 | 19.6 |
| 18 | 50 | A | 0.45 | 0.01 | 29.5 |

[1]Based on formula.
A. Benzyl methacrylate.
B. N-Phenylacrylamide.
C. 2,2,2-Trifluoroethyl acrylate.
D. 2,2,3,3-Tetrafluoropropyl acrylate.
E. Poly(propylene glycol) methacrylate (avg. MW 350–398).
F. Synthesized with 35% polymer actives.

Polymer 4

A 30% cationic (69.61/29.94/0.45 acrylamide/DMAEA.MCQ/benzyl methacrylate) water-in-oil emulsion terpolymer is synthesized as follows.

An aqueous monomer phase solution is prepared by stirring a mixture of 253.0 g of a 49.0% aqueous solution of acrylamide, 164.0 g of water, 9.0 g of adipic acid, 27.0 g of NaCl, 181.8 g of a 79.9% aqueous solution of DMAEA.MCQ, and 3.6 g of a 5% solution of EDTA.4Na$^+$ until the components dissolve.

An oil phase is prepared by heating a mixture of 233.2 g of paraffinic oil (Escaid-110, Exxon Chemical Co., Baytown, Tex.), 18.8 g of Tween-61 and 8.2 g of Span-80 until the surfactants dissolve (58° C.).

To form the emulsion, the oil phase is charged to a 2-1 reactor. While the oil phase is stirred at 950 rpm, the monomer phase is added to the reactor. The resulting mixture is stirred at 45° C. for 30 minutes. At 15 minutes into the emulsion formation, 2.0 g of benzyl methacrylate is added to the reactor. The resulting mixture is stirred for 15 minutes before the addition of initiators.

To the water-in-oil emulsion is added 0.270 g of AIBN and 0.020 grams of AIVN. The polymerization is carried out under a N$_2$ atmosphere for 4 hours at 45° C., then 65° C. for 1 hour.

Following polymerization, the reaction mixture is cooled to 45° C. and 16.8 grams of Alfonic®1412-60 is added into the water-in-oil emulsion polymer mixture over a period of 15 minutes. The resulting polymer mixture is cooled to room temperature and filtered through a 100 mesh screen. A polymer solution is made by mixing 2.0 g of the water-in-oil emulsion polymer with 198.0 g of water in a 300 ml beaker for 30 minutes with vigorous stirring, as described in U.S. Pat. No. 3,734,873. An RSV of 25.3 dl/g (450 ppm, 1M NaNO$_3$, 30° C.) is measured for the solution of the terpolymer.

For analysis, a sample of the water-in-oil emulsion polymer is precipitated in a 1:1 methanol/acetone mixture, filtered, washed several times with acetone, and dried. By $^1$H-NMR, it is estimated that 44% of the benzyl methacrylate monomer is incorporated into the polymer backbone.

Polymer 7

A 30% cationic (69:30:1 acrylamide/DMAEA.MCQ/N-phenylacrylamide) water-in-oil emulsion terpolymer is synthesized as follows.

An aqueous monomer phase solution is prepared by stirring a mixture of 13.95 g of a 49.5% aqueous solution of acrylamide, 0.50 g of adipic acid, 1.50 g of NaCl, 10.13 g of a 79.9% aqueous solution of DMAEA.MCQ, 9.01 g of water, 0.21 g of N-phenylacrylamide (Polysciences, Inc., Warrington, Pa.) and 0.18 g of a 5% aqueous solution of EDTA.4Na$^+$ until the components dissolve.

An oil phase is prepared by heating a mixture of 13.00 g of paraffinic oil, 1.05 g of Tween-61 and 0.45 g of Span-80 until the surfactants dissolve (55° C.).

The oil-phase is charged into a 125 mL baffled reaction flask, and heated to 45° C. With vigorous stirring, the monomer phase is added dropwise over 2 minutes. The resulting mixture is stirred for 90 minutes.

To the water-in-oil emulsion is added 0.015 g of AIBN and 0.001 g of AIVN. The polymerization is carried out under a N$_2$ atmosphere for 4 hours at 45° C., then 55° C. for one hour.

Following polymerization, the reaction mixture is cooled to 45° C., and 0.85 grams of Alfonic®1412-60 is added to the water-in-oil emulsion polymer mixture. The resulting polymer mixture is stirred for 45 minutes, then cooled to room temperature. A polymer solution is made by mixing 2.0 g of the water-in-oil emulsion polymer with 198.0 g of water in a 300 ml beaker for 30 minutes with vigorous stirring, as described in U.S. Pat. No. 3,734,873. An RSV of 23.7 dl/g (450 ppm, 1M NaNO$_3$, 30° C.) is measured for the solution of the terpolymer.

Polymer 8

A 30% cationic (69.5/30/0.5 acrylamide/DMAEA.MCQ/2,2,2-trifluoroethyl acrylate) water-in-oil emulsion terpolymer is synthesized as follows.

An aqueous monomer phase solution is made-up by stirring a mixture of 12.7 g of a 49.0 % aqueous solution of acrylamide, 0.45 g of adipic acid, 1.35 g of NaCI, 8.9 g of a 81.4 % aqueous solution of DMAEA.MCQ, 8.4 g of water and 0.009 g of EDTA.4Na$^+$ until the components dissolve.

An oil phase is prepared by heating a mixture of 11.7 g of paraffinic oil, 0.95 g of Tween-61 and 0.41 g of Span-80 until the surfactants dissolve (55° C.).

The oil-phase is charged into a 125 mL baffled reaction flask, and heated to 45° C. With vigorous stirring, the monomer phase is added dropwise over 2 minutes. The resulting mixture is stirred for 75 minutes. To the water-in-oil emulsion is added 0.095 g of 2,2,2-trifluoroethyl acrylate (Aldrich Chemical Company, Milwaukee, Wis.). The mixture is stirred for an additional 15 minutes at 45° C., then 0.015 g of AIBN and 0.001 g of AIVN are added to the reaction mixture. The polymerization is carried out under a N$_2$ atmosphere for 4 hours at 45° C., then at 60° C. for one hour.

Following polymerization, the reaction mixture is cooled to 45° C. and 0.81 grams of Alfonic®1412-60 is added into the water-in-oil emulsion polymer mixture. The resulting polymer mixture is stirred for 45 minutes, then cooled to room temperature. A polymer solution is made by mixing 2.0 g of the water-in-oil emulsion polymer with 198.0 g of water in a 300 ml beaker for 30 minutes with vigorous stirring, as described in U.S. Pat. 3,734,873. An RSV of 23.2 dl/g (450 ppm, 1M NaNO$_3$, 30° C.) is measured for the solution of the terpolymer.

Polymer 9

A 30% cationic (69.5/3010.5 acrylamide/DMAEA.MCQ/2,2,3,3-tetrafluoropropyl acrylate) water-in-oil emulsion terpolymer is synthesized according to the procedure of Polymer 8, except 0.11 grams of 2,2,3,3-tetrafluoropropyl acrylate (Aldrich Chemical Company, Milwaukee Wis.) is substituted for the 2,2,2-trifluoroethyl acrylate.

Polymer 10

A 30% cationic (69.5/30/0.5 acrylamide/DMAEA.MCQ/poly(propylene glycol) methacrylate) water-in-oil emulsion terpolymer is synthesized according to the procedure of Polymer 8, except 0.20 grams of poly(propylene glycol) methacrylate (MW 350-389, Aldrich Chemical Company, Milwaukee Wis.) is substituted for the 2,2,2-trifluoroethyl acrylate.

Polymer 13

A 40% cationic (59.52/40.02/0.46 acrylamide/DMAEA.MCQ/benzyl methacrylate) water-in-oil emulsion terpolymer is synthesized as follows.

An aqueous monomer phase solution is prepared by stirring a mixture of 224.0 g of a 49.5% aqueous solution of acrylamide, 123.3 g of water, 9.0 g of adipic acid, 27.0 g of NaCl, 0.09 g of sodium formate, 253.0 g of a 80.3% aqueous solution of DMAEA.MCQ and 0.2 g of EDTA.4Na$^+$until the components dissolve.

An oil phase is prepared by heating a mixture of 234.0 g of paraffinic oil, 18.9 g of Tween-61 and 8.1 g of Span-80 until the surfactants dissolve (58° C.).

To form the emulsion, the oil phase is charged to a 2-1 reactor. While the oil phase is stirred at 950 rpm, the monomer phase is added to the reactor. The resulting mixture is stirred at 45° C. for 30 minutes. At 15 minutes into the emulsion formation, 2.1 g of benzyl methacrylate is added to the reactor. The resulting mixture is stirred for 15 minutes before the addition of initiators.

To the water-in-oil emulsion is added 0.28 g of AIBN and 0.016 grams of AIVN. The polymerization is carried out under a $N_2$ atmosphere for 4 hours at 45° C., then at 60° C. for 1 hour Following polymerization, the reaction mixture is cooled to 45° C., and 16.2 grams of Alfonic®1412-60 is added into the water-in-oil emulsion polymer mixture over a period of 15 minutes. The resulting polymer mixture is cooled to room temperature. A polymer solution is made by mixing 2.0 g of the water-in-oil emulsion polymer with 198.0 g of water in a 300 ml beaker for 30 minutes with vigorous stirring, as described in U.S. Pat. 3,734,873. An RSV of 21.9 dl/g (450 ppm, 1M $NaNO_3$, 30° C.) is measured for the solution of the terpolymer.

Polymer 16

A 50% cationic (49.77/49.77/0.45 acrylamide/DMAEA.MCQ/benzyl methacrylate) water-in-oil emulsion terpolymer is synthesized as follows.

An aqueous monomer phase solution is prepared by stirring a mixture of 146.4 g of a 49.5% aqueous solution of acrylamide, 219.2 g of water, 9.0 g of adipic acid, 18.0 g of NaCl, 246.0 g of a 80.3% aqueous solution of DMAEA.MCQ and 0.18 g of EDTA.4Na$^+$until the components dissolve.

An oil phase is prepared by heating a mixture of 234.0 g of paraffinic oil, 12.6 g of Lonzest STO-20 (POE (20) sorbitan trioleate, available from Lonza Inc., Fair Lawn, N.J.) and 12.6 g of Span-80 to 58° C.

To form the emulsion, the oil phase is charged to a 2-1 reactor. While the oil phase is stirred at 950 rpm, the monomer phase is added to the reactor. The resulting mixture is stirred at 45° C. for 30 minutes. At 15 minutes into the emulsion formation, 1.64 g of benzyl methacrylate is added to the reactor. The resulting mixture is stirred for 15 minutes before the addition of initiators.

To the water-in-oil emulsion is added 0.290 g of AIBN and 0.072 grams of AIVN. The polymerization is carried out under a $N_2$ atmosphere for 4 hours at 45° C., then at 65° C. for 1 hour.

A polymer solution is made by mixing 2.0 g of the water-in-oil emulsion polymer with 197.88 g of water containing 0.12 g of Triton®N-101 (nonylphenoxy polyethoxy ethanol, Rohm and Haas, Philadelphia, Pa.) in a 300 ml beaker for 30 minutes with vigorous stirring, as described in U.S. Pat. 3,734,873. An RSV of 21.6 dl/g (450 ppm, 1M $NaNO_3$, 30° C.) is measured for the solution of the terpolymer.

Drainage Test

To perform the drainage test, 200 ml of either an industrial or municipal sludge is placed in a 500 ml cylinder. Terpolymer is added at the desired concentration and mixed by inverting the cylinder. The number of inversions is dependent upon the particular sludge utilized. Flocculated sludge is then poured through a belt filter press cloth and the amount of water (in mL) drained in 10 seconds is utilized as a measure of the polymer performance. Tables 2–6 show the results obtained using the cationic latex terpolymers of this invention in comparison to the appropriate control polymers on an equal actives basis.

As shown in Tables 2–6, the cationic latex terpolymers of this invention generally provide a greater drainage volume in 10 seconds with a lower dosage rate. Thus, the cationic latex terpolymers of this invention are more efficient than the representative control polymers 7:3 AM/DMAEA.MCQ, 6:4 AM/DMAEA.MCQ and 1:1 AM/DMAEA.MCQ polymers.

TABLE 2

30 mole % DMAEA.MCQ Polymers, Municipal Sludge A[1]

| Dose, ml[4] | Polymer 1 | Polymer 8 | Polymer 9 | Polymer 10 | Polymer 4 |
|---|---|---|---|---|---|
| 4 | 41 | 59 | 51 | 41 | 41 |
| 5 | 70 | 90 | 74 | 68 | 91 |
| 6 | 87 | 110 | 105 | 96 | 102 |
| 7 | 79 | 103 | 113 | 108 | 103 |
| 8 | 45 | 97 | | 102 | 49 |

TABLE 3

30 mole % DMAEA.MCQ Polymers, Industrial Sludge A[2]

| Dose, ml[4] | Polymer 2 | Polymer 6 | Polymer 4 |
|---|---|---|---|
| 6 | | 60 | 65 |
| 7 | 50 | 110 | 100 |
| 8 | | 100 | 92 |
| 9 | 62 | | |
| 11 | 70 | | |

TABLE 4

30 mole % DMAEA.MCQ Polymers, Municipal Sludge A[1]

| Dose, ml[4] | Polymer 2 | Polymer 4 | Polymer 7 |
|---|---|---|---|
| 6 | 51 | 88 | 65 |
| 7 | 82 | 106 | 98 |

TABLE 4-continued 30 mole % DMAEA.MCQ Polymers, Municipal Sludge A[1]

| Dose, ml[4] | Polymer 2 | Polymer 4 | Polymer 7 |
|---|---|---|---|
| 8 | 103 | 112 | 113 |
| 9 | 113 | 98 | 98 |

TABLE 5

40 mole % DMAEA.MCQ Polymers, Industrial Sludge B[3]

| Dose, ml[4] | Polymer 11 | Polymer 13 | Polymer 12 |
|---|---|---|---|
| 1.5 | 72 | 90 | 65 |
| 2 | 95 | 108 | 105 |
| 3 | 100 | 128 | 118 |
| 4 | 100 | 110 | 130 |

TABLE 6

50 mole % DMAEA.MCQ Polymers, Industrial Sludge A[2]

| Dose, ml[4] | Polymer 14 | Polymer 16 |
|---|---|---|
| 5 | 65 | 68 |
| 6 | 80 | 105 |
| 7 | 100 | 115 |
| 8 | 110 | 120 |

[1]Anerobic digested sludge from a municipal sewage facility.
[2]Waste activated chemical processing industry (CPI) sludge from Rohm & Haas.
[3]Waste activated chemical processing industry (CPI) sludge from Formosa Plastics.
[4]ml's of a 3000 ppm aqueous polymer solution prepared as described in U.S. Pat. No. 3,734,873.

As shown by the data in Tables 2–6 this invention provides improved cationic polymers for wastewater applications. The polymers are more efficient and therefore less costly to employ than currently-available latex polymers.

Various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A cationic latex terpolymer comprising:
(a) a first monomer unit selected from acrylamide and methacrylamide;
(b) a second monomer unit selected from dimethylaminoethyl acrylate methyl chloride quaternary salt, 3-(acrylamido)propyltrimethylammonium chloride, 3-(methacrylamido)propyltrimethylammonium chloride, dimethylaminoethyl methacrylate methyl chloride quaternary salt, dimethylaminoethyl acrylate dimethylsulfate quaternary salt, dimethylaminoethyl methacrylate dimethylsulfate quaternary salt, diethylatninoethyl acrylate methyl chloride quaternary salt and diethylaminoethyl acrylate dimethylsulfate quaternary salt; and
(c) a third monomer unit selected from benzyl methacrylate, 2,2,2-trifluoroethyl acrylate, acrylamide diacetone, N-phenylacrylamide, 2,2,3,3-tetrafluoropropyl acrylate and poly(propylene glycol) methacrylate, wherein the latex terpolymer is prepared by:
(i) emulsifying an aqueous solution comprising water soluble monomers and an oil phase comprising a hydrocarbon oil and one or more water-in-oil emulsifying agents to form a water-in-oil emulsion;
(ii) optionally adding water-insoluble monomers;
(iii) adding one or more oil-soluble radical initiators;
(iv) polymerizing the monomers; and
(v) optionally adding an inverting surfactant.

2. The cationic latex terpolymer of claim 1 having a cationic charge of from about 20% to about 80%.

3. The cationic latex terpolymer of claim 1 having a cationic charge of from about 30 mole percent to about 70 mole percent.

4. The cationic latex terpolymer of claim 1 wherein the third monomer is benzyl methacrylate in an amount of from about 0.01 to about 2 mole percent.

5. The cationic latex terpolymer of claim 1 wherein the third monomer is benzyl methacrylate in an amount of from about 0.2 to about 0.7 mole percent.

6. The cationic latex terpolymer of claim 1 wherein the third monomer is benzyl methacrylate in an amount of about 0.45 mole percent.

7. The cationic latex terpolymer of claim 1 further comprising chain transfer agent.

8. The cationic latex terpolymer of claim 7 wherein the chain transfer agent is sodium formate in an amount of from about 0.0025 to about 0.08 weight percent based on formula.

9. The cationic latex terpolymer of claim 1 wherein the third monomer is benzyl methacrylate in an amount of from about 0.2 to about 0.7 mole percent and the polymer further comprises sodium formate in an amount of from about 0.0025 to about 0.08 weight percent based on formula.

10. The cationic latex terpolymer of claim 1 wherein the third monomer is N-phenylacrylarnide in an amount of from about 0.2 to about 1.2 mole percent.

11. The cationic latex terpolymer of claim 1 wherein the third monomer is 2,2,2-trifluoroethyl acrylate in an amount of from about 0.2 to about 0.7 mole percent.

12. The cationic latex terpolymer of claim 1 wherein the third monomer is 2,2,3,3-tetrafluoropropyl acrylate in an amount of from about 0.1 to about 0.5 mole percent.

13. The cationic latex terpolymer of claim 1 wherein the third monomer is poly(propylene glycol)methacrylate in an amount of about 0.45 mole percent, wherein the poly (propylene glycol)methacrylate monomer has a molecular weight of from about 350 to about 389.

14. The cationic latex terpolymer of claim 1 wherein the first monomer is acrylamide and the second monomer is dimethylaminoethyl acrylate methyl chloride quaternary salt.

15. The cationic latex terpolymer of claim 14 wherein the mole ratio of acrylamide monomer units to dimethylaminoethyl acrylate methyl chloride quaternary salt monomer units is from about 8:2 to about 2:8.

16. The cationic latex terpolymer of claim 14 wherein the mole ratio of acrylamide monomer units to dimethylaminoethyl acrylate methyl chloride quaternary salt monomer units is from about 7:3 to about 3:7.

17. The cationic latex terpolymer of claim 1 wherein the first monomer unit is acrylamide, the second monomer unit is dimethylaminoethylacrylate methyl chloride quaternary salt and the third monomer unit is benzyl methacrylate, wherein the terpolymer has a cationic charge of from about 30 mole percent to about 70 mole percent and the benzyl methacrylate present in a amount ranging from about 0.2 mole percent to about 0.7 mole percent.

18. The cationic latex terpolymer of claim 17 further comprising from about 0.0025 to about 0.08 weight percent by formula of sodium formate.

19. A method for flocculating sludge comprising adding to the sludge an effective amount of the cationic latex terpolymer of claim 1.

20. The method of claim 19 wherein the cationic latex terpolymer is added in an amount of from about 10 to about 600 ppm based on polymer actives.

21. A method of separating solids from waste water comprising the:

(a) adding an effective amount of the cationic latex terpolymer of claim 1 to the waste water;

(b) mixing the waste water and cationic latex terpolymer to form a mixture of water and flocculated solids and (c) separating the flocculated solids from the water.

22. The method of claim 21 wherein the cationic latex terpolymer is added in an amount of from about 10 to about 600 ppm based on polymer actives.

23. The method of claim 21 wherein the flocculated solids are separated from the water by filtration.

* * * * *